(No Model.)
B. H. TYSON.
CAR COUPLING.
No. 327,124. Patented Sept. 29, 1885.
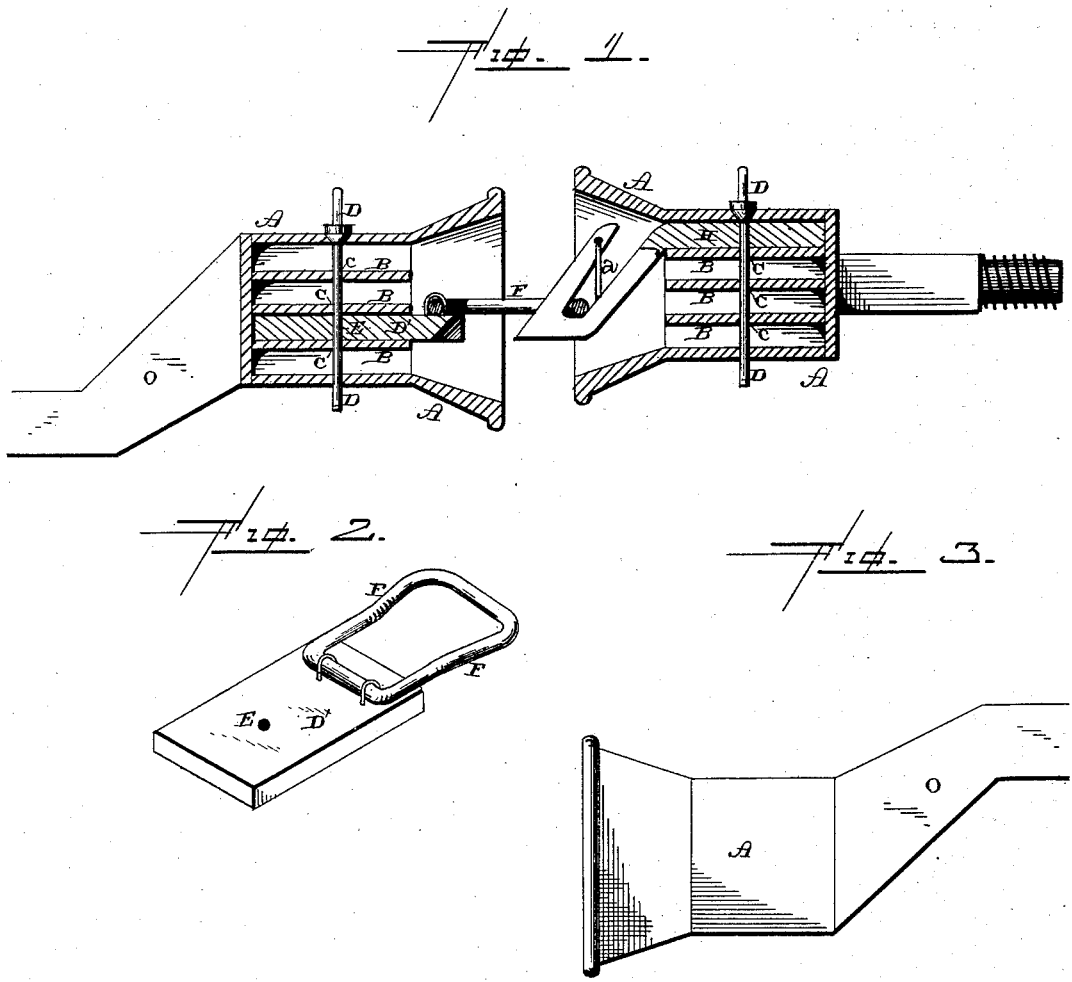

UNITED STATES PATENT OFFICE.

BENJAMIN H. TYSON, OF WILSON, NORTH CAROLINA.

CAR-COUPLING.

SPECIFICATION forming part of Letters Patent No. 327,124, dated September 29, 1885.

Application filed August 3, 1885. (No model.)

*To all whom it may concern:*

Be it known that I, BENJAMIN H. TYSON, of Wilson, in the county of Wilson and State of North Carolina, have invented certain new and useful Improvements in Car-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in car-couplers; and it consists in, first, the combination of the two draw-heads, which are divided by a series of horizontal partitions, with the coupling link and hook, which are applied to opposite draw-heads; second, the combination of the coupling-hook, provided with a movable stop which swings across the mouth of the hook and prevents the hook from being jarred or shaken out of position, with the hook which is loosely secured upon the top of the coupling-block, which fits in one of the draw-heads, and is provided with a hole at its inner end for the coupling-pin to pass through.

The object of my invention is to produce a self-coupler both for freight and passenger cars, and which will prevent the necessity of brakemen having to enter between the ends of the cars for the purpose of coupling them when they run together, and so as to allow the cars to swing freely around curves.

Figure 1 is a vertical longitudinal section of a car-coupling embodying my invention. Fig. 2 is a perspective of a coupling-link. Fig. 3 shows one of the draw-heads reversed in position.

A represents the coupling-heads, which may be of any suitable shape or size that may be preferred, and which are divided by the horizontal partitions B. There will be any suitable number of these partitions and any suitable distances or spaces between them, and through all of these partitions will be made a hole, C, for the coupling-pin D to pass through. Both of the heads are constructed alike, though it is intended to use a coupling-link in one and a coupling-hook in the other. The coupling-link consists of a flat block, D', having a hole, E, through its inner end for the coupling-pin to pass through, and upon the top of the outer end of which is loosely fastened the coupling-link F. The end of this link is fastened upon the top of the block by any suitable devices which will securely hold the link in position. The link is fastened upon the top of the block, so that the link can never drop down below a horizontal position, while it can rise upward to any desired height for the purpose of coupling together two draw-heads which are of different heights. It does not matter in which one of the divisions of the draw-heads the block is placed, so long as the link will reach up to and pass over the top of the coupling-hook which is in the other draw-head. By means of this construction the link is always held in a horizontal position ready for coupling. The couplings in which the two heads are out of line with each other will couple as well and as freely as though they were both the same height.

The coupling-hook H consists of a suitable flat coupling-block, which fits one of the divisions in either one of the draw-heads, and which has a hole through its inner end for the coupling-link to pass through. The hook is formed so as to project either downward from the block or it can be curved downward, as is here shown. By curving the hook downward it can be made to couple with cars which carry their draw-heads at the very lowest point to which they can possibly be placed. The outer end of the hook is curved or beveled away, as shown, so that when the coupling-link strikes at any point above its very lowest edge the link will rise up over the top of the hook and drop down into position.

In order to prevent the coupling-link from becoming detached accidentally from the hook in any possible manner, there is pivoted to the inner end of the hook a suitable stop, $a$, which is moved forward as the link enters the hook, and then automatically drops back into position and acts as a stop to prevent the link from being pushed backward and upward out of the hook either by jars or any twisting movement to which the cars may be subjected. Before the link can be uncoupled from the hook it will be necessary for a brakeman to push the stop forward out of position, so that the end of the link can be forced from under it.

In case it should be desired to uncouple the cars in ascending a grade, it is only necessary to pull out one of the coupling-pins, so that one of the blocks will draw freely out of its draw-head. Owing to the free movement between the parts and the distance between the two draw-heads when the cars are coupled together, the cars can swing freely around a curve, no matter how short, and without the slightest binding or unnecessary friction on any of the parts. This distance between the draw-heads also allows the cars of the freight-trains the slack that is necessary to enable them to start in motion. Where the parts are rigidly connected together there is no movement between the ends of the draw-heads, and the cars are held so rigidly together that it is almost impossible to start them while standing.

One or both of the rear inner ends of the draw-heads may be turned or formed at an angle, as shown at O in Fig. 1, for the purpose of making the draw-heads reversible. When the draw-head is turned in one position, it will be raised into the highest position in which it can be placed, and when withdrawn from the car and then placed in position after being reversed, this inclined part will throw the head down into the very lowest position. In this manner the draw-heads are made reversible in position.

Having thus described my invention, I claim—

1. In a car-coupling, the combination of the two draw-heads A, which are divided by partitions B into a number of chambers, as shown, with the coupling-link consisting of a flat block, D', having the link F connected thereto, and the coupling-hook H, substantially as shown.

2. The combination of the block D', provided with a hole, E, for the coupling-pin D to pass through, with the link F, which is loosely secured upon the top of its outer end, so that the link cannot drop down below a horizontal position, substantially as set forth.

3. The coupling-hook for car-couplings, composed of a flat block and a hook formed upon its outer end, in combination with a pivoted stop, which is loosely connected to the inner side of the hook, substantially as specified.

4. A draw-head having its inner end formed at an angle, whereby the head, by reversing it in position, may be raised or lowered, substantially as set forth.

In testimony whereof I affix my signature in presence of two witnesses.

B. H. TYSON.

Witnesses:
F. A. LEHMANN,
PHILIP F. LARNER.